United States Patent
Bargagli et al.

(10) Patent No.: US 10,417,632 B2
(45) Date of Patent: Sep. 17, 2019

(54) SYSTEM AND METHOD FOR SECURE ELECTRONIC PAYMENT

(71) Applicant: Openpay, S.A.P.I. de C.V., Queretaro (MX)

(72) Inventors: Roberto Bargagli, Queretaro (MX); Heber Lazcano, Queretaro (MX)

(73) Assignee: Openpay, S.A.P.I. de C.V., Queretaro (MX)

( * ) Notice: Subject to any disclaimer, the term of this patent is extended or adjusted under 35 U.S.C. 154(b) by 456 days.

(21) Appl. No.: 15/001,109

(22) Filed: Jan. 19, 2016

(65) Prior Publication Data

US 2017/0116597 A1    Apr. 27, 2017

Related U.S. Application Data

(60) Provisional application No. 62/245,940, filed on Oct. 23, 2015.

(51) Int. Cl.
| | | |
|---|---|---|
| *G06Q 20/40* | (2012.01) | |
| *G06Q 20/36* | (2012.01) | |
| *H04L 29/08* | (2006.01) | |
| *H04L 29/06* | (2006.01) | |

(52) U.S. Cl.
CPC ............ *G06Q 20/36* (2013.01); *G06Q 20/40* (2013.01); *G06Q 20/4014* (2013.01); *H04L 63/0823* (2013.01); *H04L 63/12* (2013.01); *H04L 67/02* (2013.01); *H04L 67/10* (2013.01); *H04L 63/0272* (2013.01); *H04L 63/166* (2013.01)

(58) Field of Classification Search
USPC .................................................. 705/44, 4
See application file for complete search history.

(56) References Cited

U.S. PATENT DOCUMENTS

| | | | |
|---|---|---|---|
| 9,824,342 B2 * | 11/2017 | Kelly | G06Q 20/14 |
| 2013/0218721 A1 * | 8/2013 | Borhan | G06Q 20/322 |
| | | | 705/26.41 |
| 2013/0290234 A1 * | 10/2013 | Harris | G06N 5/022 |
| | | | 706/46 |
| 2014/0279474 A1 * | 9/2014 | Evans | G06Q 20/3572 |
| | | | 705/41 |
| 2015/0012426 A1 * | 1/2015 | Purves | G06Q 30/0623 |
| | | | 705/41 |
| 2015/0039462 A1 * | 2/2015 | Shastry | G06Q 30/0633 |
| | | | 705/26.7 |
| 2015/0073907 A1 * | 3/2015 | Purves | G06Q 20/32 |
| | | | 705/14.58 |

(Continued)

OTHER PUBLICATIONS

Vemo security not as strong as the company wants you to think, 15 pages, Alison Griswold Feb. 15, 2015 (Year: 2015).*

*Primary Examiner* — Bruce I Ebersman
(74) *Attorney, Agent, or Firm* — ALG Intellectual Property, LLC

(57) ABSTRACT

A payment system is described. The payment system includes a transaction system. The transaction system is configured to receive a request for a code to complete a sales transaction, the request including information about the sales transaction. The payment system is also configured to, in response to said request for said code to complete said sales transaction, generate said code based on the information about the sales transaction. Further, the transaction system is configured to transmit said code to a merchant.

21 Claims, 7 Drawing Sheets

(56) References Cited

U.S. PATENT DOCUMENTS

| | | | |
|---|---|---|---|
| 2015/0095174 A1* | 4/2015 | Dua | G06Q 20/20 |
| | | | 705/21 |
| 2015/0120536 A1* | 4/2015 | Talker | G06Q 20/367 |
| | | | 705/39 |
| 2015/0312041 A1* | 10/2015 | Choi | H04L 9/3231 |
| | | | 713/175 |
| 2016/0109954 A1* | 4/2016 | Harris | G06F 3/017 |
| | | | 345/156 |

* cited by examiner

SYSTEM AND METHOD FOR SECURE ELECTRONIC PAYMENT

CROSS-REFERENCE TO RELATED APPLICATIONS

This application claims priority from U.S. Provisional Patent Application No. 62/245,940, filed on Oct. 23, 2015, which is hereby incorporated by reference in its entirety.

FIELD

Embodiments of the invention relate to electronic payment systems. In particular, embodiments of the invention relate to electronic payment systems using electronic wallets.

BACKGROUND

As technology advances, these advancements increase the opportunity for fraud with legacy payment methods, such as credit cards. Attempts to increase the securing of legacy payment methods include the use of electronic wallets. However, electronic wallets use proprietary systems which require both a merchant and a consumer to use the same propriety system. The existence of multiple proprietary systems used by many customers results in a high cost for merchants because the merchants are forced to support multiple electronic systems or risk alienating customers. Further, these electronic wallets also have proven to be susceptible to fraud increasing the cost of operating the electronic wallet systems.

SUMMARY

A payment system is described. The payment system includes a transaction system. The transaction system is configured to receive a request for a code to complete a sales transaction, the request including information about the sales transaction. The payment system is also configured to, in response to said request for said code to complete said sales transaction, generate said code based on the information about the sales transaction. Further, the transaction system is configured to transmit said code to a merchant.

Other features and advantages of embodiments will be apparent from the accompanying drawings and from the detailed description that follows.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

Embodiments of a payment system are configured to work with merchants and electronic wallets to enable secure sales transactions. The payment system is configured to interface with merchants through an interface. For example, an interface includes an application programming interface ("API"). The interface, for example, provides a merchant access to the payment system after registering with the payment system. The payment system is also configured to interface with one or more electronic wallets through an interface. The interface, for example, provides an electronic wallet provider access to the payment system after registering with the payment system. The payment system is configured to receive a request from a merchant for a code in response to a customer making a purchase. The payment system generates a code for the purchase and sends this code to the merchant. The merchant system displays or otherwise provides the code to the customer to scan or enter into a payment application, for example, by using the electronic wallet on a mobile device. The electronic wallet notifies the payment system of the status of the transaction. In turn, the payment system notifies the merchant regarding the status of the transaction. Based on this authentication and verification process, the electronic wallet vender pays the merchant.

Thus, the payment system is an open platform providing open access to many electronic wallets or similar payment application without the need for a merchant to be limited by a proprietary system. Further, the authentication and verification by the payment system without the need to transmit sensitive payment information, such as credit card numbers or bank information, protects both the customer and the merchant from fraud and/or liability resulting from fraud. Because the merchant does not receive the sensitive payment information, the merchant is not at risk for exposing this information or having this sensitive information leaked opening up the merchant to either the high cost to protect this information and/or the liability associated with an exposure of this information. Further, the electronic wallet notifies the user of a transaction providing the customer the ability to deny or confirm a transaction, thus further limiting an opportunity for fraud.

Figure 1:
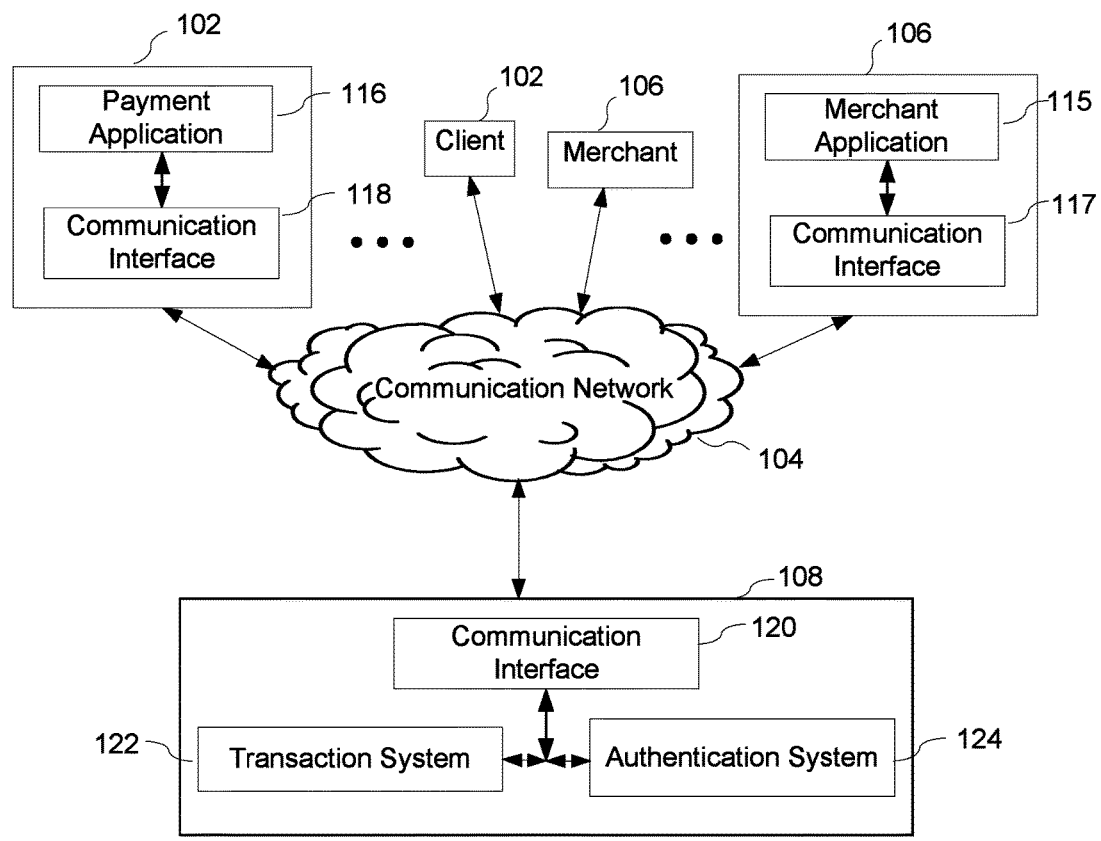
FIG. 1 illustrates a block diagram of a distributed system including a payment system according to an embodiment.

FIG. 1 illustrates a block diagram of a distributed system including a payment system according to an embodiment. One or more client systems 102 are coupled with a payment system 108 through a communication network 104. A communication network 104 includes, but is not limited to, a wide area network ("WAN"), such as the Internet; a local area network ("LAN"); wireless network; or other type of network. The client system 102, includes, but is not limited to, a computer, a tablet, a smart phone, a user device or other device configured to run applications to transact a sale with a merchant.

As illustrated in FIG. 1, one or more merchants systems 106 are coupled with the payment system 108 through the communication network 104. For an embodiment, the merchant systems 106, the payment system 108, and the client systems 103 are configured to transmit and receive communications over the communication network 104 using secure communication channels including, but not limited to, transport layer security ("TLS"), secure sockets layer ("SSL")

protocol, virtual private network ("VPN"), or other secure communication technique. A merchant system 106 is configured to run a merchant application 115, which includes, but is not limited to, an API, a sales transaction application, a web site, or other application for transacting a sale, which includes accepting and verifying payment. The merchant system 106 also includes a communication interface 117 configured to transmit and receive data over the communication network 104 using techniques including those known in the art. The one or more client systems 102 may also be coupled with at least one merchant system 106. A merchant system 106 may include, but is not limited to, a computer, a server, a distributed system, or other system configured to sell or complete a sale of a product or a service. The client system 102, as illustrated in FIG. 1, is configured to run a client application 116, which includes, but is not limited to, a web browser, an electronic wallet, or other application configured to communicate with a merchant. The client system 102 also includes a communication interface 118 configured to transmit and receive data over the communication network 104 using techniques including those known in the art.

The payment system 108, for an embodiment, includes a communication interface configured to transmit and receive data over the communication network 104 using techniques including those known in the art. The payment system 108 also includes a transaction system 122 configured to generate a code for a purchase using techniques including those described herein. Further, the payment system 108 includes an authentication system 124 configured to validate information using techniques including those described herein. For an embodiment, an authentication system 124 is configured to use SSL authentication and/or hypertext transfer protocol ("HTTP") basic authentication with a user name and a password to authenticate communications from a client system 102 and/or a merchant system 106. One skilled in the art would understand that the authentication system 124 could be configured to use other authentication techniques including those known in the art. The authentication system 124 is configured, for an embodiment to generate a signature using techniques including those describe herein to include in a notification, a message, and an acknowledgement generated by the payment system 108. The authentication system 124 is also configured to validate a request/notification and/or a signature included in the request/notification received from a merchant system 106 and/or a client system 102. For example, an authentication system 124 is configured to use a private key corresponding to a public key used by a merchant system 106 and/or a client system 102 to decrypt a request/notification received and/or a signature to validate that the request/notification is authentic and originated from a trusted source using techniques including those known in the art. Further, the payment system 108, according to an embodiment, is configured to generate an acknowledgment that the payment transaction was a success. For example, a payment system 108 is configured to generate an acknowledgment to transmit to a payment application 116 to confirm that a merchant system 106 received payment.

Figure 2:
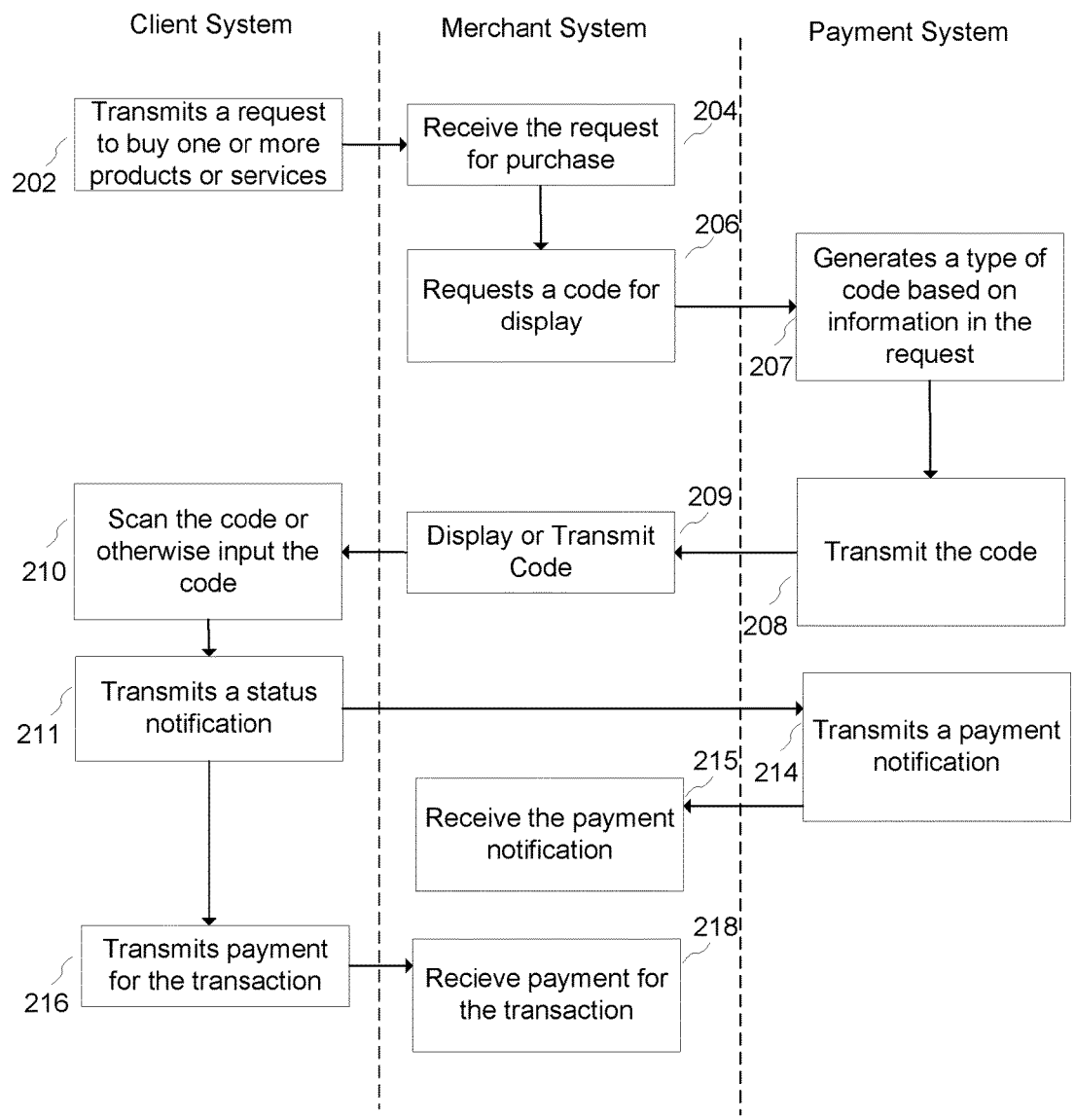
FIG. 2 illustrates a flow diagram of exemplary communications between members of a distributed system including a payment system according to an embodiment.

FIG. 2 illustrates a flow diagram of exemplary communications between members of a distributed system including a payment system according to an embodiment. A customer using a client system selects products or services and transmits a request to buy one or more products or services to a merchant system (202). The merchant system receives the request for purchase (204) and in response, the merchant system requests a code for display on the merchant system from a payment system (206). The code includes, but is not limited to, a barcode, a quick response ("QR") code, a matrix code, single use password, electronic personal-identification number ("PIN"), token, short message service ("SMS") with a challenge response, or other code used to incorporate information about a transaction.

For an embodiment, the request for a code from a merchant system includes information about the product or service being purchased. For example a request for a code may include a type of code requested, a product name, a description of the product, a stock keeping unit ("SKU"), a total number of products, a unit price, a total price, a purchase date and time, and an expiration date and time. A request may be in the form of a data structure including, but not limited to, extensible markup language ("XML"), JavaScript object notation ("JSON") or other format of arranging data. For example, a request may include the total number of purchased products, the product unit price, the purchase total amount, and the purchase date and time. For an embodiment, the request includes a signature used by the payment system to authenticate the sender of the request. For example, a signature is a hash value of the data included in the request. The signature and request may then be encrypted using an API credential transmitted to a merchant system during a registration with the payment system. The API credential includes, but is not limited to, a private key generated by a payment system during a registration process. For example, a signature is generated using a private key such as an X509 V3 certificate generated using a 2048 bit-length RSA algorithm. The request may also include an HTTP header using techniques including those know in the art.

The payment system, for an embodiment, generates a type of code based on information in the request (207). The payment system transmits the code to the merchant system (208) and the code is displayed to the client system (209). For an embodiment, a code is displayed by the merchant system in a checkout page of a website, e-mail, mobile application, or printed in a receipt or invoice. For another embodiment, a code may be transmitted by the merchant system to the client system. The client system then uses a payment application such as an electronic wallet ("e-wallet") to scan the code or otherwise input the code into the payment application (210). The payment application transmits a status notification to the payment system (211). The status notification could be in the form of an authorization or an acceptance of the transaction with the merchant. For example, a status notification is generated by a payment application to include one or more of the code received from the merchant system, the payment method, the real amount of the sale, an authorization code, and customer information such as a name, e-mail, or other information. For an embodiment, a status notification is a JSON message including a code, an authorization code generated by a payment application, the total price for the transaction, and the payment date. Further, the JSON message may include a signature generated by the payment application a private key, received from the payment system during registration using techniques including those described herein.

The payment system, in response to receiving an authorization of the payment, transmits a payment notification to the merchant system to confirm payment (214), which is received by the merchant system (215). For example, a payment notification is generated by the payment system based on the authorization code received from a payment application. For example, a payment notification is a JSON message that includes the authorization code and a signature generated by the payment system using a private key that corresponds to the API credential received by the merchant system during registration. The payment notification may also include one or more of the code, the payment method, the real amount of the sale, an authorization code, and customer information such as a name, e-mail, or other information. For an embodiment, both the status notification and the payment notification are encrypted using techniques described herein such as using an API credential. The payment application transmits payment for the transaction to the merchant system (216), which is received by the merchant system (218).

Figure 3:
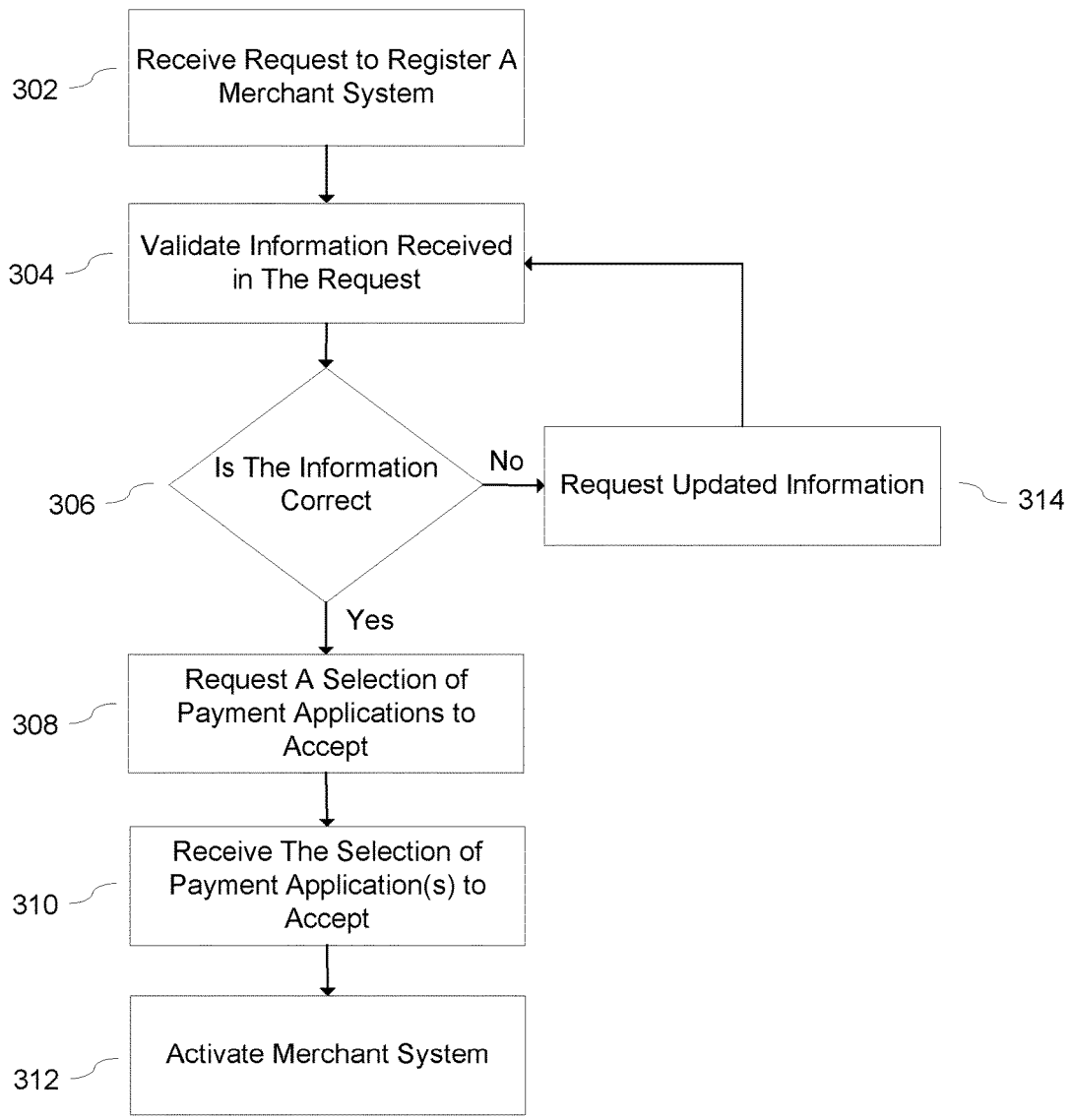
FIG. 3 illustrates a flow diagram of a method to register a merchant system with a payment system according to an embodiment.

FIG. 3 illustrates a flow diagram of a method to register a merchant system with a payment system according to an embodiment. A merchant system transmits a request to register to a payment system (302). For an embodiment, a request to register is transmitted by submitting information requested on a web page directed to registering a merchant system with a payment system using techniques including those known in the art. The information submitted with the request to register a merchant system is validated (304). For example, account information entered would be confirmed with the issuer of the account. Examples of information that a merchant system provides includes, but is not limited to, legal entity name, headquarters address, website, data universal numbering system ("D-U-N-S") number and work contact. The information will be validated for payment system with local and/or international databases. If the information is determined to be correct (306), the payment system is configured to request a selection of payment applications to accept for the merchant system (308). For example, the merchant system is directed to a web page that provides a selection of one or more payment applications for the merchant system to select. The payment system is configured to receive the selection of the payment applications to accept (310). The payment system is configured to activate the merchant system (312). For an embodiment, a payment system configured to activate a merchant system includes the payment system sending application programming interface ("API") credentials to the merchant system and a private certificate for signing transmissions between the merchant system and the payment system. Another example includes a payment system sending a merchant system an e-mail including a private certificate, a private password, and the credentials of the API.

If at block 306 the information is determined to be incorrect, the payment system sends a request to the merchant system for updated information (314). For example, the payment system is configured to send a request for updated information by displaying an error message indicating that information provided is incorrect or could not be validated. The payment system is then configured to validate the updated information and continue the process as described above.

Figure 4:
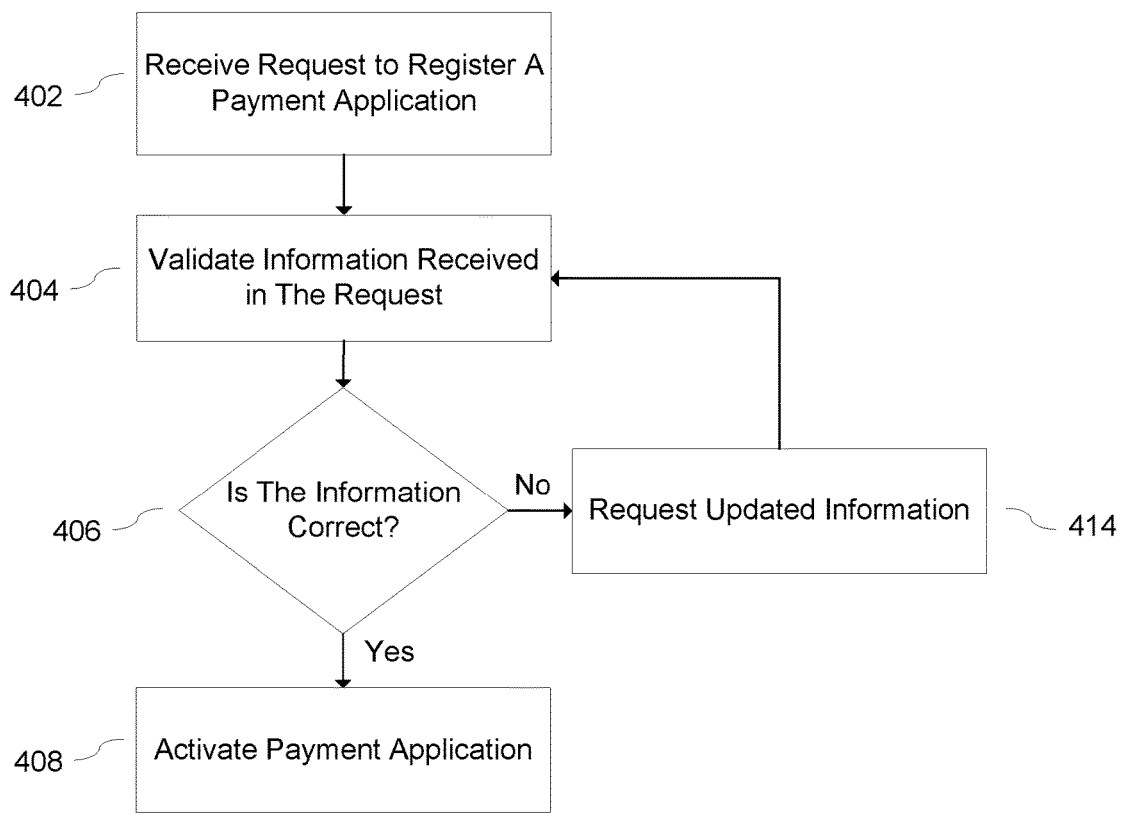
FIG. 4 illustrates a flow diagram of a method to register a payment application with a payment system according to an embodiment.

FIG. 4 illustrates a flow diagram of a method to register a payment application with a payment system according to an embodiment. A payment system receives a request register to a payment application (402). For an embodiment, a request to register is transmitted by submitting information requested on a web page directed to registering a payment application with a payment system using techniques including those known in the art. For example, a payment application provider may access a website of the payment system directed to registering a payment application. The information submitted with the request to register a payment application is validated (404). For example, account information entered would be confirmed with the issuer of the account.

Examples of information that a payment application provides include, but are not limited to, legal entity name, headquarters address, website, D-U-N-S Number and work contact. The information will be validated for payment system with local and/or international databases. If the information is determined to be correct (406), the payment system is configured to activate the payment application (408). For an embodiment, a payment system is configured to activate a payment application includes the payment system sending API credentials to the payment application provider and a public certificate for signing transmissions between the payment application and the payment system. Another example includes a payment system sending the payment application an e-mail including a private certificate, a private password and the credentials of the API.

Figure 5:
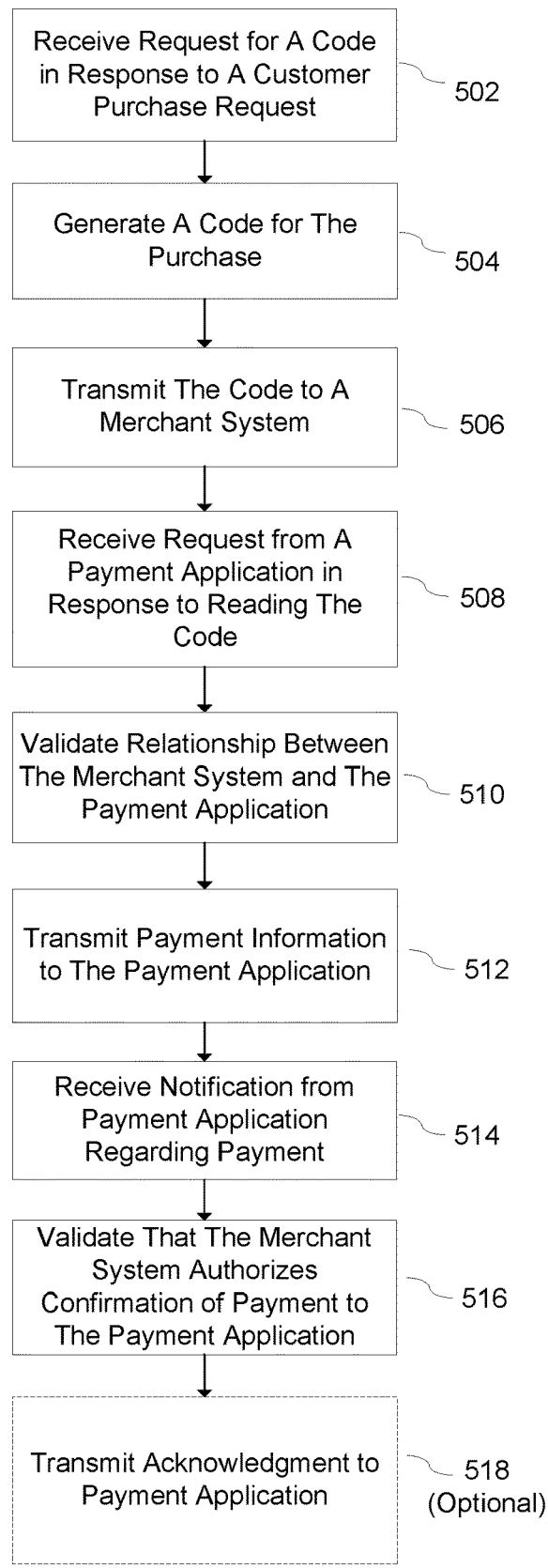
FIG. 5 illustrates a flow diagram of a method for a payment transaction according to an embodiment.

FIG. 5 illustrates a flow diagram of a method for a payment transaction according to an embodiment. The method includes receiving a request for a code in response to a customer purchase request (502) using techniques including those described herein. Further, the method includes generating a code for the purchase (504) techniques including those described herein. The generated code includes, but is not limited to, a barcode, a QR code, a matrix code, an electronic pin, and a token. The method also includes transmitting the code to the merchant system (508). In addition, the method includes validating the relationship between the merchant and the payment application (510) using techniques including those describe herein. The method includes transmitting payment information to the payment application (512). The method also includes receiving a status notification from the payment application regarding payment (514). The method also includes validating that the merchant system authorizes confirmation of the payment to the payment application (516). If the merchant system authorizes a confirmation of the payment be sent to the payment application, the method optionally includes transmitting an acknowledgment to the payment application (518). For example, an authorization code is generated using techniques including those in the art and the authorization code is transmitted to the payment application as an acknowledgment. An acknowledgment includes, but is not limited to, a message that includes an authorization code that indicates the payment was processed successfully, a message that indicates the payment was not processed successfully, and other type of indication of the status of a transaction.

Figure 6:
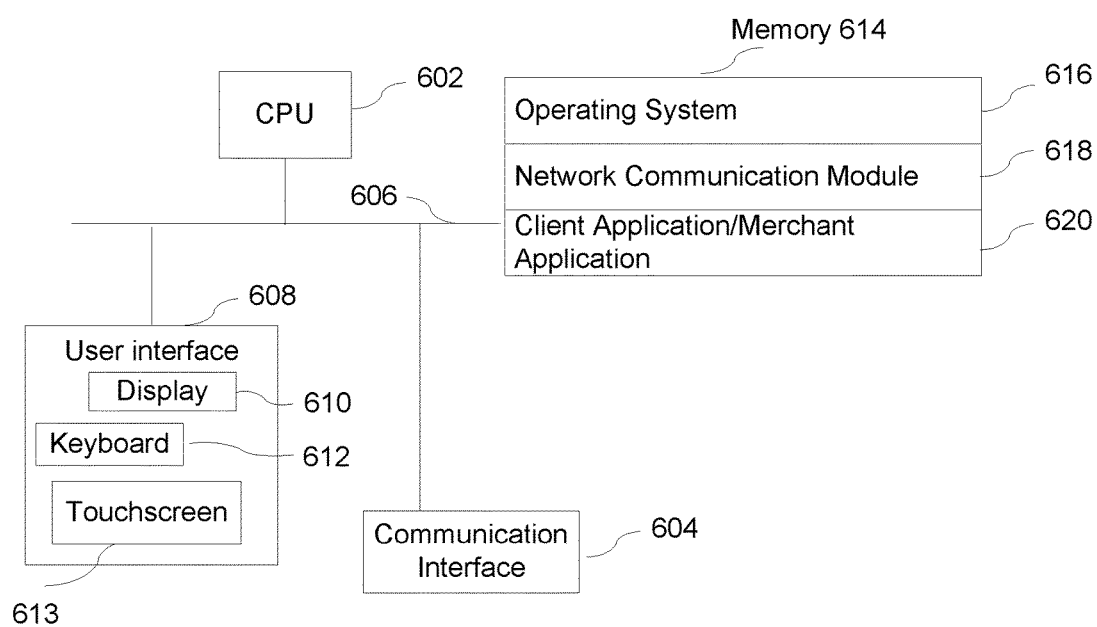
FIG. 6 illustrates a client system/merchant system according to an embodiment.

FIG. 6 illustrates an embodiment of a client system/merchant system configured to perform one or more aspects of the methods described herein. The client system/merchant system includes one or more processing units (CPUs) 602, one or more network or other communication interface 604, memory 614, and one or more communication buses 606 for interconnecting these components. The client system/merchant system may include a user interface 608 comprising a display device 610, a keyboard 612, a touchscreen 613 and/or other input/output device. Memory 614 may include high speed random access memory and may also include non-volatile memory, such as one or more magnetic or optical storage disks. The memory 614 may include mass storage that is remotely located from CPUs 602. Moreover, memory 614, or alternatively one or more storage devices (e.g., one or more nonvolatile storage devices) within memory 614, includes a computer readable storage medium. The memory 614 may store the following elements, or a subset or superset of such elements:

an operating system 616 that includes procedures for handling various basic system services and for performing hardware dependent tasks;

a network communication module 618 (or instructions) that is used for connecting the client system/merchant system to other computers, clients, servers, systems or devices via the one or more communications network interfaces 604 and one or more communications networks, such as the Internet, other wide area networks, local area networks, metropolitan area networks, and other type of networks; and a client application or a merchant application 620 including, but not limited to, a web browser, a payment application, a transaction applications, a web site, an application programming interface or other application for transacting a payment and/or a sale.

According to an embodiment, the client system may be any device that includes, but is not limited to, a mobile phone, a computer, a tablet computer, a personal digital assistant (PDA), or other mobile device. A merchant system maybe any device that includes, but is not limited to, a computer, a server, a distributed system, or other system used to implement a sale transaction.

Figure 7:
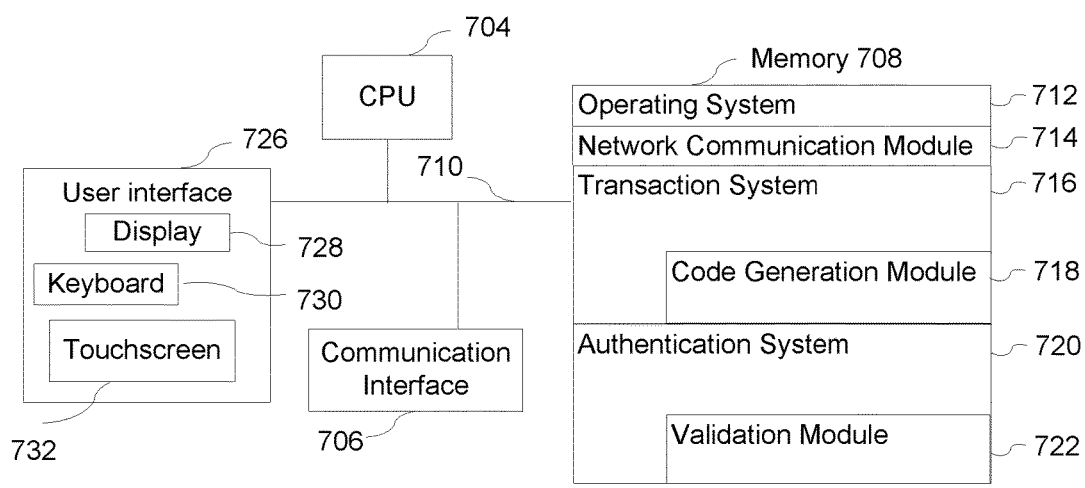
FIG. 7 illustrates a block diagram of a distributed system for implementing a payment system according to an embodiment.

FIG. 7 illustrates an embodiment of a server, such as a system that implements one or more aspects of the methods described herein. The system, according to an embodiment, includes one or more processing units (CPUs) 704, one or more communication interface 706, memory 708, and one or more communication buses 710 for interconnecting these components. The system may optionally include a user interface 726 comprising a display device 728, a keyboard 730, a touchscreen 732, and/or other input/output devices. Memory 708 may include high speed random access memory and may also include non-volatile memory, such as one or more magnetic or optical storage disks. The memory 708 may include mass storage that is remotely located from CPUs 704. Moreover, memory 708, or alternatively one or more storage devices (e.g., one or more nonvolatile storage devices) within memory 708, includes a computer readable storage medium. The memory 708 may store the following elements, or a subset or superset of such elements: an operating system 712, a network communication module 714, a transaction system 716 (or instructions) including a code generation module 718 (or instructions), and an authentication system 720 (or instructions) including a validation module 722 (or instructions). An operating system 712 that includes procedures for handling various basic system services and for performing hardware dependent tasks. A network communication module 714 (or instructions) that is used for connecting the payment system to other computers, clients systems, merchant systems, peers, systems or devices via the one or more communication network interfaces 706 and one or more communication networks, such as the Internet, other wide area networks, local area networks, metropolitan area networks, and other type of networks.

In the foregoing specification, specific exemplary embodiments of the invention have been described. It will, however, be evident that various modifications and changes may be made thereto. The specification and drawings are, accordingly, to be regarded in an illustrative rather than a restrictive sense.

What is claimed is:

1. A payment system comprising:
  a communication interface configured to send and receive communications over a communication network; and
  a transaction system communicatively coupled, by way of said communication interface and said communication network, to a merchant system and a client system, said transaction system configured to:
    receive a request to register said merchant system with said payment system, said request to register including information about said merchant system;
    validate said information included in said request to register;
    receive a selection of a payment application as being accepted by said merchant system;
    activate said merchant system within said payment system, said activation of said merchant system including said transaction system sending, to said merchant system, application program interface credentials and a private certificate for signing transmissions between said merchant system and said payment system;
    receive, by way of said communication interface and over said communication network, a request from said merchant system for a code to complete a sales transaction between said merchant system and said payment application installed by said client system, the request including information about said sales transaction and indicating a type of code requested by said merchant system;
    in response to said request for said code to complete said sales transaction, generate said code based on said information about said sales transaction and said type of code requested by said merchant system;
    transmit said code to said merchant system by way of said communication interface and over said communication network, said merchant system configured to provide said code to said client system;
    receive, over said communication network from said payment application of said client system, a payment status notification indicating said code and an authorization of said sales transaction;
    generate, in response to receiving said payment status notification indicating said code and said authorization of said sales transaction, a payment notification to confirm a payment by said payment application of said client system; and
    transmit, by way of said communication interface and over said communication network, said payment notification to said merchant system.

2. The system of claim 1, wherein said request is in a JavaScript object notation format.

3. The system of claim 2, wherein said request includes one or more of any of the following: a product name, a description, a stock keeping unit, a total number of products, a unit price, a total price, purchase data and time, and an expiration date and time.

4. The system of claim 1, wherein said request includes a signature.

5. The system of claim 1, wherein said request is received over a secure socket layer.

6. The system of claim 1, wherein said request includes a hypertext transfer protocol header.

7. The system of claim 4, wherein said signature is generated using a public key.

8. The system of claim 7 further comprising an authentication system configured to validate said signature.

9. The system of claim 1, wherein said payment status notification includes an authorization code from said payment application.

10. The system of claim 9, wherein said payment notification is based on said authorization code.

11. The system of claim 8, wherein said authentication system is configured to use a private key corresponding to said public key to validate said signature.

12. The payment system of claim 1, wherein said transaction system is further configured to:
validate a relationship between said merchant system and said payment application; and
generate and transmit said payment notification to said merchant system after validating said relationship between said merchant system and said payment application.

13. The payment system of claim 1, wherein said merchant system is configured to provide said code to said client system by displaying said code for scanning or entry into said payment application of said client system.

14. The payment system of claim 13, wherein said code comprises one of a barcode, a quick response ("QR") code, a single use password, and a personal identification number ("PIN").

15. The payment system of claim 1, wherein said merchant system does not receive sensitive payment information from said payment application of said client system.

16. A method for securing an electronic payment comprising:
at least one or more servers including one or more processors and memory:
receiving a request to register a merchant system with a payment system, said request to register including information about said merchant system;
validating said information included in said request to register;
receiving a selection of a payment application as being accepted by said merchant system;
activating said merchant system within said payment system, said activating of said merchant system including sending, to said merchant system, application program interface credentials and a private certificate for signing transmissions between said merchant system and said payment system;
receiving, over a communication network, a request from said merchant system for a code to complete a sales transaction between said merchant system and said payment application installed by a client system, the request including information about said sales transaction and indicating a type of code requested by said merchant system;
in response to said request for said code to complete said sales transaction, generating said code based on said information about said sales transaction and said type of code requested by said merchant system;
transmitting said code to said merchant system over said communication network, said merchant system configured to provide said code to said client system;
receiving, over said communication network from said payment application of said client system, a payment status notification indicating said code and an authorization of said sales transaction;
generating, in response to receiving said payment status notification indicating said code and said authorization of said sales transaction, a payment notification to confirm a payment by said payment application of said client system; and
transmitting, over said communication network, said payment notification to said merchant system.

17. The system of claim 16, wherein said request includes a signature.

18. The system of claim 17 further comprising validating said signature.

19. The system of claim 18 further comprising using a private key corresponding to a public key to validate said signature.

20. The method of claim 16, wherein said payment status notification includes an authorization code from said payment application.

21. A non-transitory computer-readable storage medium storing one or more programs for execution by one or more processors, the one or more programs including instructions for:
receiving a request to register a merchant system with a payment system, said request to register including information about said merchant system;
validating said information included in said request to register;
receiving a selection of a payment application as being accepted by said merchant system;
activating said merchant system within said payment system, said activating of said merchant system including sending, to said merchant system, application program interface credentials and a private certificate for signing transmissions between said merchant system and said payment system;
receiving, over a communication network, a request from said merchant system for a code to complete a sales transaction between said merchant system and said payment application installed by a client system, the request including information about said sales transaction and indicating a type of code requested by said merchant system;
in response to said request for said code to complete said sales transaction, generating said code based on said information about said sales transaction and said type of code requested by said merchant system;
transmitting said code to said merchant system over said communication network, said merchant system configured to provide said code to said client system;
receiving, over said communication network from said payment application of said client system, a payment status notification indicating said code and an authorization of said sales transaction;
generating, in response to receiving said payment status notification indicating said code and said authorization of said sales transaction, a payment notification to confirm a payment by said payment application of said client system; and
transmitting, over said communication network, said payment notification to said merchant system.

* * * * *